May 19, 1936.  H. E. BLOMGREN  2,041,319
INTERNAL COMBUSTION ENGINE
Filed Oct. 22, 1932   4 Sheets-Sheet 2
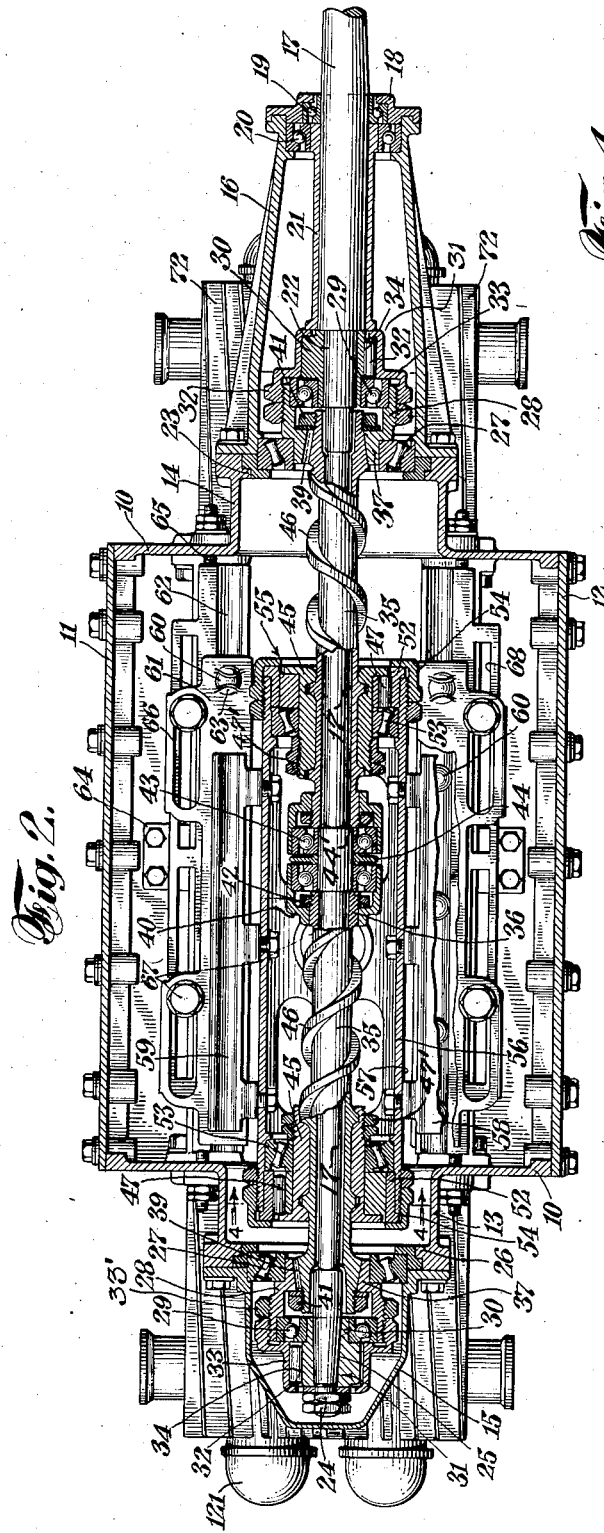
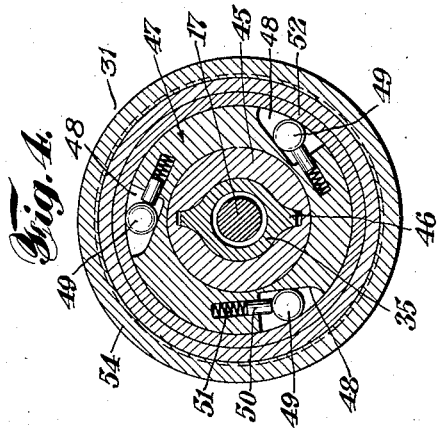
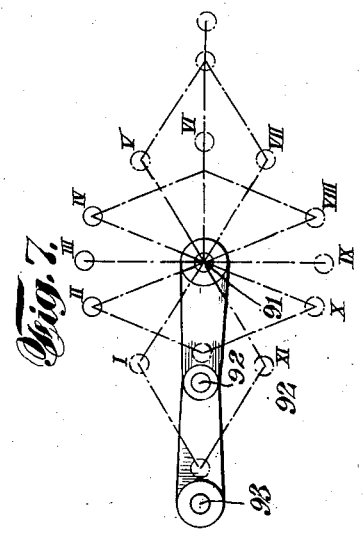
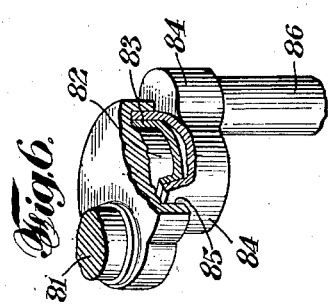
INVENTOR
Henry E. Blomgren
BY
Kenyon & Kenyon
ATTORNEYS

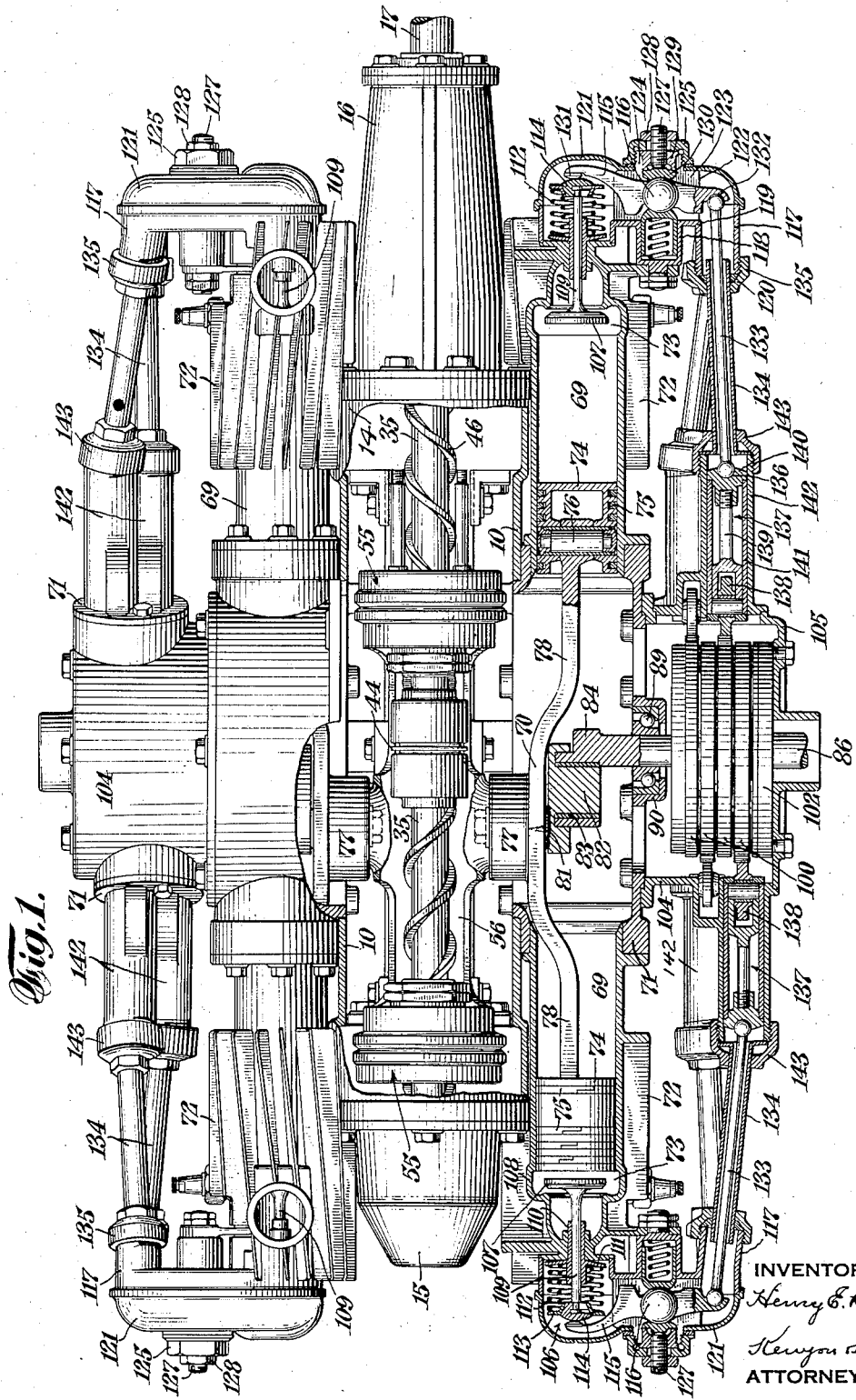

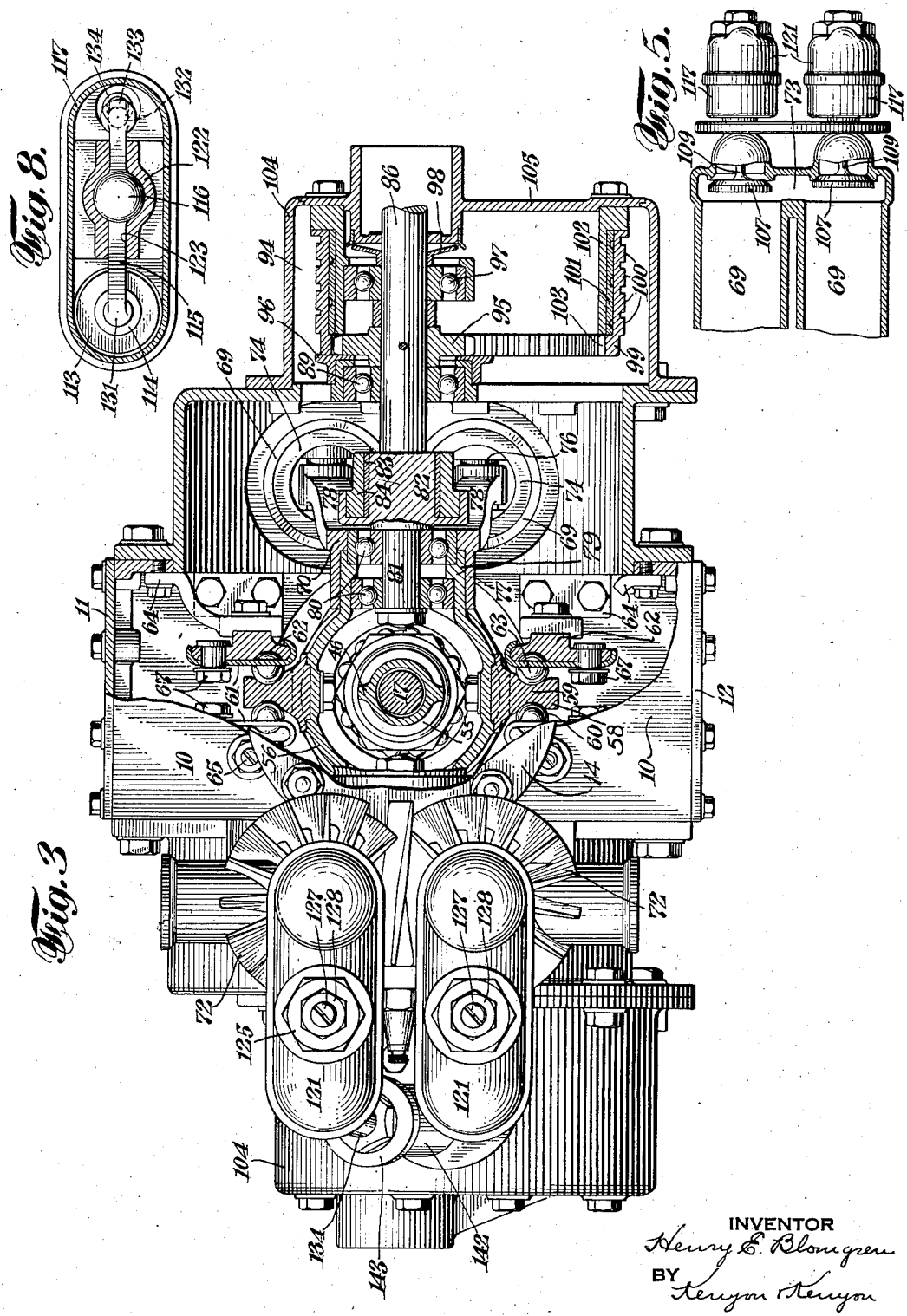

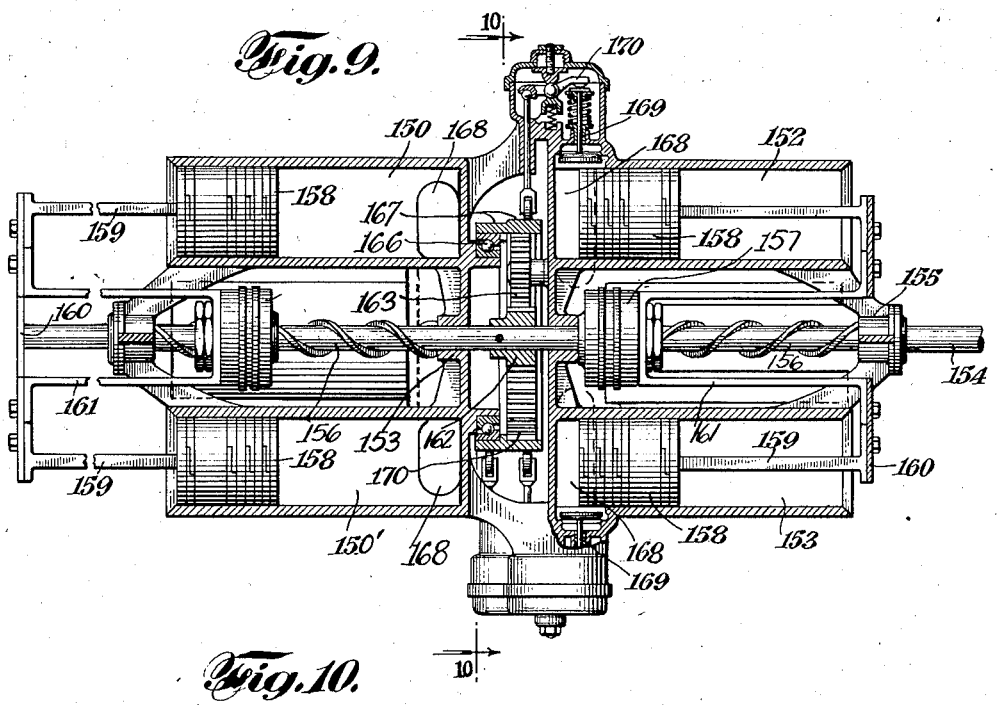
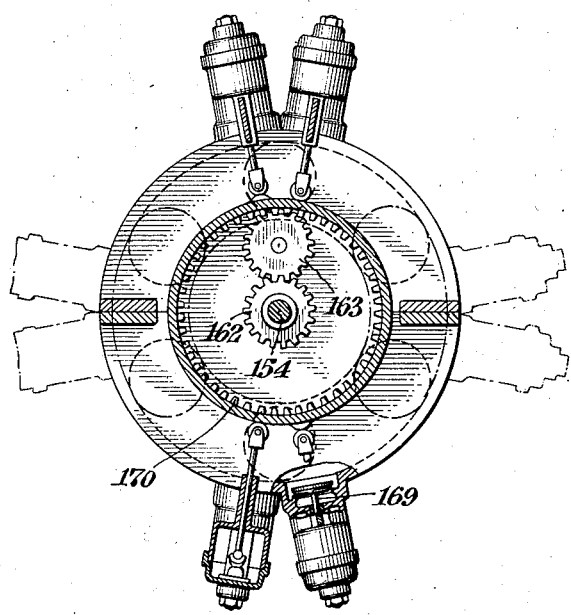
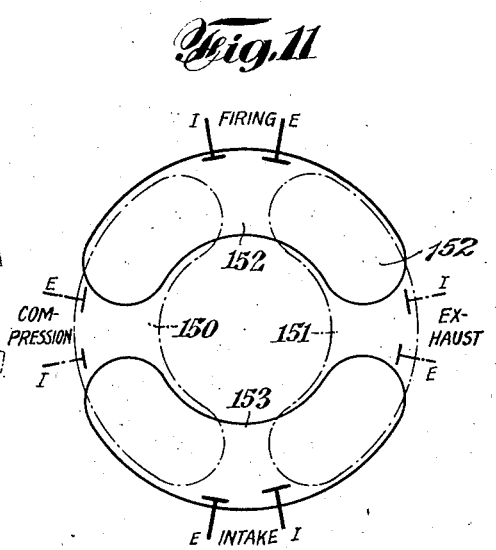

Patented May 19, 1936

2,041,319

UNITED STATES PATENT OFFICE 2,041,319

INTERNAL COMBUSTION ENGINE

Henry E. Blomgren, Central Park, N. Y., assignor of one-fourth to William D. McGurn, Rockville Centre, N. Y.

Application October 22, 1932, Serial No. 639,055

6 Claims. (Cl. 123—58)

The invention relates to and has for an object the provision of an internal combustion engine of the expansible chamber reciprocating piston type that is compact, light and efficient.

The majority of engines now in use, particularly those having a comparatively large horse-power per pound ratio, are subject to great weakening stresses. These stresses are due to many factors, notably high speeds of operation and large centrifugal and gyroscopic forces. Particularly is this true of the radial engine with a large number of explosions for each revolution of the crank shaft. In addition, such engines offer great resistance to the wind even when hooded and often are not adapted to be mounted in the most efficient position where compactness and support is a consideration as, for example, in the wing of an airplane.

In the engine of this invention, there is no power crank shaft or modification of a crank shaft, with the result that rotating stresses in the essential power transmitting or sustaining members are non-existent. Instead, reciprocating members act to turn a drive shaft and the component parts of the engine are grouped in close parallelism around this shaft. High piston speeds may be eliminated if desired by raising the ratio of revolutions per working stroke. On the other hand, where it is desired to secure maximum power by rapid succession of power strokes in each cylinder, with use of comparatively slow propeller speed or driven shaft speed, the motor may be operated at high speed and an extremely simple reduction effected in the transmission. Better cooling of the engine cylinders is obtained by the use of apparatus which conducts the cooling medium around a longer path past the cylinder walls without increasing resistance to the flow of the medium.

Frequent troubles are caused in engines by the valves. The end of the valve stem wears or the rocker arm bushing wears, permitting the arm to rock laterally, thus disturbing valve operation. Timing cams of the small heart type give a severe blow to the rods each revolution besides wearing the rods by the continuous rubbing. My motor overcomes these objections.

More particularly, this invention discloses an engine which is propelled by a continuous twisting of proper shafts, by reciprocating devices and consequently the enclosing chamber can be very small and compact. Too, in an embodiment to be described, weight is saved by splitting up the number of cylinders and also by using common firing chambers. The last-named eliminate several mechanisms as well. The engine cooling is done by air, and new fins are provided having a slight twist to develop more cooling surface without adding resistance. In overhauling, the labor is reduced to the simple unbolting of a series of sections of the engine casing. Again, in providing an engine in which the revolutions per stroke ratio is very high, a low speed, long life motor is obtained. These elements and their functions are among the primary objects and advantages of this invention.

Other objects and advantages and features of invention will appear from the description and drawings, in which Figure 1 is a top view of one embodiment of the engine of this invention in partial longitudinal section, showing the valve assembly in detail.

Figure 2 is a longitudinal section of the engine.

Figure 3 is an end view of the engine with the cam stroke limiting mechanism in section.

Figure 4 is a sectional view of a one-way clutch suitable for use in this engine, taken on line 4—4 of Figure 2;

Figure 5 is a sectional view of a firing chamber in the engine.

Figure 6 is an enlarged detail view of the crank mechanism and cam shaft driving arrangement.

Figure 7 is a diagrammatic view of the operation of said crank.

Figure 8 is a cross section of a rocker arm unit.

Figure 9 is a longitudinal sectional view of a modification of this invention.

Figure 10 is a sectional view thereof taken on line 10—10 of Figure 9 to show the timing mechanism; and Figure 11 is a firing diagram of the engine shown in Figure 9, showing the location of the firing chamber as viewed from the right of Figure 9.

Referring to the drawings, 10 indicates a portion of the engine casing enclosing the center of the motor and having a closure plate 11 at the top and a similar closure plate 12 below. At each end of the casing 10 there is an integral turret 13 and 14, the outer edges of which represent the extreme limits of movements of parts making an engine stroke. An end cap 15 closes the rear turret 13 and the rear of casing 10. Bolted to turret 14 is a funnel-form extension 16, the small end of which is outermost and serves to support the front end of a drive or propeller shaft 17. Shaft 17 is a solid shaft having portions of various diameters which runs the whole depth of the engine into end cap 15. A small plate 18 surrounds shaft 17 and locks two ball bearings 19 and 20 in the end of extension 16. Just inside the plate 18 a sleeve 21 closely fits revolubly around shaft 17 and bears against the forward clutch assembly, to be described, there being one such at each end of the motor. Movement of the assembly forward is also prevented by an enlarged forward portion of the shaft 17 and in the other direction by an interior flange 23 of turret 14. Similarly, in a reverse manner, the rear clutch assembly is prevented from movement outward by the threaded end of the shaft 17 and nuts 24. Movement of the shaft inwardly is impossible because of a taper 25 on shaft 17 and a similar flange 26 on turret 13. Thus, from one end of the engine to the other, rigidity and resistance to reciprocating stresses is found.

Each clutch assembly, located at the outer edges of turrets 13 and 14 respectively, comprises a roller thrust bearing 27 which is locked between the inner edges of the cap 15 and cone 16 and the respective flanges 26 and 23. The bearing 27 supports a hollow cylindrical cup 28 having an enlarged diameter at one end and adapted in its smaller portion to receive the tapered end of a hollow shaft 35 to be described. Nesting within the larger diameter of the cup 28 there is a ball-bearing 29, the inner race of which is fitted on a flange 30 of the inner member of a one-way clutch 31. This inner member tightly fits the shaft 17—at one clutch on taper 25 and at the other on the surface 22 of the shaft at the front end. Each center portion 31 has inclined notches 34 around the outer periphery similar to those numbered 48 in Figure 4, to be described. Steel rolls 32 with axes parallel to the axis of shaft 17 are placed one in each notch. Around the outside of clutch 31 there is a cap 33 having a threaded portion engaging the outside of cup 28. A lock nut 33' is also similarly engaged, holding the cap 33. The cap 33 and cylindrical cup 28 are thus connected with shaft 17 only through the medium of clutch 31 which only engages to turn shaft 17 in this embodiment in a clockwise direction when viewed from the front.

Closely fitting revolubly around the respective parts of the shaft 17, and taking up the entire distance between the two clutch assemblies 31 there are two oppositely-threaded, hollow worm shafts 35 both of the same length whose ends are tapered at 37 respectively to fit into the previously mentioned tapered openings in the bottoms of the cups 28, where they are fastened by keys 39. Lock nuts 41 hold the outer ends of shafts 35 securely in place here and constitute another factor preventing to and fro movement of those parts of the engine designed to operate without longitudinal displacement. Their inner ends 36 are threaded for a short distance and a cup fitting 40 similar to the cup 28 is screwed thereon and locked in place by a nut 42. Inside each cup fitting 40 there is a ball bearing 43, the inner race of which is fitted upon an enlarged section 44' of the drive shaft 17, maintaining a concentric relation between the drive shaft 17 and hollow shafts 35. A spacer ring 44 fits between the inner races of the ball bearings 43 to complete the shaft assembly. On each shaft 35 there is engaged a driver or nut 45 having internal worm grooves fitting the threads 46 of the worm shaft and both drivers are carried in a traveller 56 as will be described. Inward movement of either driver will cause the respective clutch 31 to engage and turn the drive shaft 17 while the other clutch 31 runs free. In the engine shown, a working stroke occurs every time a driver 45 moves inwardly on its threaded shaft 35.

On each driver there is a clutch 47 the outer member of which is fixed on the follower frame 56. The clutches 47 are constructed to engage and lock the nuts 45 against counter-clockwise movement but permit free rotation of the nuts clockwise when the drivers are moved outwardly along the worm shafts, so that no reversal of movement of the worm-shafts or nuts is necessary.

As in Figure 4, each clutch 47 comprises an inner member secured on the driver 45 by lock nuts 47', and is provided with a series of inclined notches 48 in which a series of steel rolls 49 are placed, one to a notch, tending to be propelled out upon the incline by plungers 50 and springs 51. An outer member or ring 52 fits revolubly around the part 47. All four clutches in this engine as described are similar to one another and act to engage in the same direction. Next to the clutch 47 on the nut 45 there is a roller thrust bearing 53 and a screw cap 54 completes a follower assembly 55 at each driver.

The drivers are connected together by a rigid follower frame or traveller 56 by means of the caps 54. The frame 56 is cut away in parts to reduce weight, for ventilation, lubrication and access to parts therewithin.

At the top and bottom of the frame 56 there are formed external longitudinal grooves 57 into which suspending or guide rails 58 are bolted. Each of these rails has a web portion 59 inserted between tracks 62 and are formed with longitudinal channels opposed to corresponding grooves in the tracks, ball bearings 60 being interposed and held in the channels and the grooves. Sliding retainers 61, which hold the balls 60 in spaced relation are bolted slidably to the fixed track 62 of which there is one on each side of each rail. The four tracks 62 are fastened to the ends and center of the casing frame 10 by brackets 64 and in addition are positioned against longitudinal movement by adjustable positioning bolts 65.

When the follower frame 56 is at one end of its stroke and begins its return, the driver at the outer end of a worm shaft 35 will immediately—because its respective clutch 47 engages—begin to twist its hollow shaft 35 and through the respective clutch turn the drive shaft 17 as soon as the speed of the shaft 35 exceeds that of the shaft 17. At the same time, the clutch 31 in the other clutch assembly moving outward will release to permit rotation of the other hollow shaft 35 to continue in a clockwise direction by previously imparted momentum, and remains disengaged until it in turn begins a stroke from the outer end toward the middle of the engine. According to the pitch of the threaded hollow shafts 35, a single stroke, instead of causing a fraction of a revolution of the drive shaft 17 to take place, may cause the drive shaft to be rotated one for one, two for one, or any ratio which works out in operation.

The eight cylinders 69 for this engine as here embodied are placed in sets of four at each end of the drive shaft 17 and parallel therewith in opposed relation. In turn, those at each end are in close coupled pairs on opposite sides of the shaft 17 and alined with respective pairs at the opposite end of the motor. The cylinders are bolted to similar case extension portions 71 secured to the main casing 10. Arranged around the outside of each cylinder casing 69 are the longitudinal helicoidal cooling fins 72 of slight inclination or circumferential extent, so that incident cooling air always impinges on the fins and a greater area of cylinder wall than would be the case if the fins intended circumferentially to a greater extent. The fins 72 offer extremely low resistance to the passage of the air also.

Each set of two cylinders 69 has a common firing chamber 73 effecting two results: first, decreasing the weight of the engine because two small pistons with the same total displacement weigh less than one large piston; and, secondly, weight is saved because the number of valves required is cut in half. In an engine using a crank shaft, it is impracticable to divide up cylinders in this manner.

In each cylinder 69 there is a piston 74 with packing rings 75 and a wrist pin 76 to which is fastened the connecting rod 70 of which there is one on each side of the motor. Each connecting rod comprises a hub 77 and four integral longitudinal arms 78, connected to respective wrist pins, two at each end. The connecting rods 70 are offset inwardly at their middle parts (which carry the hub 77) for ready connection with the follower frame 56. The follower frame 56 is provided on each side with similarly placed hubs 79 over which the hubs 77 on the connecting rods 70 exactly fit. Two ball bearings 80 longitudinally spaced are provided in each hub 79, supporting a hub shaft 81 having an eccentric wrist 82 on the outer end thereof and constituting a link (as between 92 and 93 of Figure 7). A bushing 83 and a collar 84 fit around the wrist 82 and within a concentric cylindrical flange 85 formed on the link. This collar 84 is integral with and comprises a crank on one end of a cam shaft 86. The cam shaft 86 projects through a ball-bearing 89 and cover plate 90, formed integrally with the case extensions 71. The radius of the crank 82 is the same as that of the crank collar 84 on the shaft 86.

The diagrammatic view Figure 7 shows the fixed center of shaft 86 at 91; 92 is the center of the crank 82 and collar 84, while the center of the hubs and shaft 81 is indicated at 93. The movement of the crank center 92 around the fixed center 91 is indicated at successive stages by primes. The dead center distance between the hub center 93 and the fixed center 91 will be exactly one-half of the engine stroke. Indeed, this crank motion in which the connected hub center 93 moves an equal distance to both sides of the shaft center 91 is a novel way of getting a large stroke for a small throw. This mechanism has as its additional function, the absolute control of the stroke of the engine.

On one side of the engine the cam shaft 86 is continued through a cam chamber 94 and extends into a position where it may be reached for purposes of cranking and starting the engine. If, as sometimes happens, the center of hub 77 and the shaft 86 coincide, cranking by means of the cam shaft 86 might just revolve the two coinciding arms instead of forcing the hub center 93 to move back and forth. Any desired means may be employed to initiate slight movement of the piston-connecting-rod-hub assembly, after which turning of shaft 86 will move the hub center 93 with respect to the cam center 91 and the engine is started without any difficulty. Starting of the engine may be effected by rotating the main drive shaft 17 by any approved means, not shown, there being several commercially available.

A gear 95 is keyed to the cam shaft 86 next to the ball bearing 89 and is maintained in position by a spacer 96. The shaft 86 is supported further out by a ball bearing 97 in a bracket from the flange 102 and then passes through an oil retainer 98 to the outside. Barrel cams 99 having four faces 100 machined on the outside thereof are carried on drum flanges 102 with interposed cylindrical bushings 101. The inner edge of each cam 99 is provided with internal gear teeth 103, projecting inwardly beside the flange 102 and meshing with the gear 95 which is eccentrically placed with respect to the cam 99, in a proper relation for positive timing, as will appear. The outer edge of each barrel cam 99 bears against the respective spacer 96. Comprising the cam chamber there is a terminal section 104 of the engine casing having an integral head plate 105 to which the drum bearing 102 is bolted so as to extend into the cam chamber 94. Provision is made on one side, as may be seen from Figure 3 to make one of the cam shafts 86 accessible for cranking. With this single exception and the extension of the drum shaft at one end the engine is perfectly symmetrical and sealed although the shaft 17 may be extended at both ends, if desired. In this eight cylinder engine there are but eight operating valves which are all that are necessary for four cycle action because of the fact that there is a common firing chamber 73 for each two cylinders 69. Each valve unit 106 which is of overhead type is provided with a poppet valve head 107 of nearly or quite the same diameter seating itself in the integral cylinder head 108. The valve has a stem 109 which extends upwardly. A removable sleeve guide 110 surrounds the stem 109 in the top of the cylinder. This guide is provided with an upwardly extending circular flange 111 on which two concentric valve springs 112 are seated, oppositely wound to obtain the best possible valve balance. These springs 112 are retained at the upper end by a conical valve cup 113 which fits over the end of the valve stem 109 and is kept in place by a valve key 114 slotted to engage with a reduced portion of the stem so that the key 114 is lockingly seated exactly in the center of the conical cup 113.

Associated with each valve unit 106 there is a rocker arm 115 which is flat with the exception of the ball pivot 116. A valve casing 117 bolted to cylinder 69 has the plunger recess 118 in which there is fitted a plunger 119 and spring 120. The upper end of each plunger 119 serves as the under part of a bearing for the rocker arm pivot 116. A top 121 completely encloses the valve mechanism and closes the valve casing 117. Projecting through the top 121 just above the ball pivot 116 is the upper threaded end of the rocker arm guide 122 which is formed below into a bifurcated bearing surface 123 which fits close to the flat sides of the rocker arm 115 for a sufficient distance on each side of the pivot 116 (see Figure 8). The rocker arm guide 122 holds screwed on its threaded hub 124 a cap 125 by which the top 121 is held in place. The cap 125 is pierced through the middle and a set screw 127 projects therethrough and is locked in position by nut 128 on top of cap 125 and nut 129 at the inner side of the cover. The lower end of the set screw 127 engages the back of an upper bearing block 130 for the rocker arm ball pivot 116. In order to vary the clearance of a presser head 131 extending from the front end of the rocker arm 115 and overhanging the valve key 114, all that is necessary is to change the position of the set screw 127 which will (in conjunction with spring 120) move the pivot 116 either up or down.

The rear end of each rocker arm 115 terminates in a socket 132 in which the upper ball end of a push rod 133 acts. The rod 133 extends downwardly through an enclosing tube 134, maintained in position by a cap 135 screwed to the valve casing 117, which tube is not restricted in its axial movement, to permit a certain amount of play and for adjustment purposes. The lower end of the rod 133 rests in a socket 136 on top of the valve tappet 137.

In this embodiment a cam roller 138 is mounted in the tappet, against the cam 100 in the fork of a rod 138, a threaded member 140 containing the socket 136 being at the other end of the rod, and a tappet wall 141 secured between the two last named. The tappet slides in a cylinder 142 bolted directly to the outside of the cover plate 105. The lower end of the valve rod tube 134 is located and secured inside the cylinder 142 by a cap 143. Two valve units 106 are located on each side of the engine and include an intake valve and an exhaust valve. Two cylinders 142 are machined in one casting. Excepting the difference in time of operation, each one of the eight valves 106 is similar to every other one. This type of valve mechanism ensures extremely accurate and reliable operation over a long period of time.

In operation, a crank is applied to cam shaft 86 which extends outside the case and because of the gears 87 and 88, the hub of the follower frame 56 must move back and forth until the engine starts. Thereupon one set of the pistons at one end, one-quarter of the total number, will be at the end of the compression stroke and the compressed charge will be ignited, propelling the two pistons, and causing the follower 55 which is then at the outer end of its stroke in that direction to move toward the middle. Clutch 47 engages and causes the respective driver to twist shaft 35. This turning of one threaded shaft will cause clutch 31 in the proper clutch assembly to turn the drive shaft 17 for that stroke a number of revolutions obtained by dividing the stroke by the pitch of the threads 46 on the hollow shaft 35. At the same time, the hub shaft 81 and the crank 82 will cause the cam shaft 86 to rotate, actuating the valves to prepare two cylinders 69 opposite those last mentioned for firing when the idling follower 55 comes to the end of its outward stroke. This succession of working strokes continues, and inasmuch as the explosions of all of the total number of cylinders occur at four equally timed intervals, the drive is continuously positive. The fact that the drive shaft 17 will turn two or three revolutions for each stroke provides a slow speed, long life engine.

Overhauling an engine of this type is a simple matter because of the fact that only four separate portions of the casing frame 10, two on each side, namely 71 and 104, have to be unbolted and the motor will be in sections. Because of the fact, too, that there is no large crank throw and because every reciprocating part efficiently fits into position parallel to the drive shaft 17, there is to be found in this engine a comparatively great power output for size and weight in a four cycle engine. With compact engines such as the one described, it is also possible to mount many such in tandem positions on a single drive shaft and obtain advantages thereby for certain types of work. When two such units are timed so that the follower frames move in opposite directions at the same time vibration will be negligible.

In another form of the invention shown in Figures 9 through 11, the preferred type of engine is in a sense divided through the middle and the two portions are placed with the two end sets of cylinders head to head with the result that the working stroke will now take place from the middle of the engine outward. However, the actual lines of separation or number of parts are not here shown. This form of the engine also assumes a more circular form in cross section. Cam means in the new form are disposed in the center between the adjacent heads of the cylinders. Thus, Figures 9 and 10 show a twelve cylinder engine constructed according to this modification, with horizontal cylinders in two longitudinally opposed cylinder block units or groups, six on each, with their heads toward each other. The cylinders at opposite ends are not necessarily alined however, as illustrated in the first structure. An inspection of Figure 11 will show that for the six cylinders at each end there are two firing chambers so that if three cylinders above a horizontal plane have a common chamber 152 as do the three cylinders below at 153, then the six cylinders in the other group will have two common firing chambers 150—151 on opposite sides of a vertical plane. This is done to effect the simplest timing.

In Figure 9, 150 represents a cylinder having a common firing chamber with the cylinders 150' immediately below it, the chamber being omitted in taking the sectional view. Cylinders 152, 153 are not so connected by a common firing chamber, but may be connected to horizontally adjacent cylinders omitted in the view, by the firing chambers at 168. This is disclosed by the firing diagram in Figure 11. A solid drive shaft 154 is provided as in the main embodiment and is supported in the main brackets 155. Closely fitting over the single drive shaft 154 are two oppositely threaded hollow shafts 156, one for each half of the engine, and having a well-known function, as before described. Followers 157 are engaged upon their respective threaded shafts 156 as in the first described structure. Each cylinder has a piston 158 and connecting rod 159. Each connecting rod is bolted at its end to a flat annular disc 160 which surrounds the main shaft 154. There is one such disc 160 for each end of the engine, and the two must be rigidly connected, in accordance with the action of the first described structure. The inner edge of each disc 160 is connected by a U-bracket 161 to the respective follower 157, and establishes a rigid connection between cylinders and follower 157. The cam mechanism is between the cylinder blocks and is driven directly by a gear 162 keyed to drive shaft 154 and meshing with an idler gear 163 in turn engaging with the internal gear 169 on the inside of barrel cam 165. This cam is supported by large ball bearings 166 mounted on one unit of the engine, and is provided with two exterior cam faces 167 for the entire four firing chambers 168. Because of this fact the four sets of two valves each are spaced exactly ninety degrees from each other around the circumference of the engine (Fig. 10). Each valve assembly includes valve rod 169 and rocker 170 and embodies all features and advantages to be found in the valve mechanism associated with the preferred form of engine as described.

Again, the firing is timed so that one half of the cylinders on each end fire at one time so that the main drive shaft 154 is always being positively rotated. In order that all connecting rods 159 on one end of the engine will move back and forth in unison, the two contiguous firing chambers at any end will be engaged in complementary cyclic strokes, as, firing and intake or exhaust and compression. The six cylinders at the other end of the engine are so timed that the compression stroke of their pistons begins as the pistons at the first end begin to move outwardly. The advantages accruing to the main type of engine accrue to this modification and the details of mechanism may be varied in many ways by skilled persons.

I claim:

1. In a motor, two longitudinally opposed sets of rectilinear cylinders all parallel to a common geometrical axis, respective reciprocating pistons in the cylinders, a common connection between all the pistons including a traveller having a lateral hub, said common connection being pivotally connected to the hub, and a power transmitting means operatively connected to the traveller.

2. The structure of claim 1 a separate power transmission comprising a revolubly mounted shaft on an axis at right angles to the direction of reciprocation of the traveller, a link pivoted on the traveller on an axis in a plane coincident with the axis of the said shaft, and a crank of the same radius fixed on the shaft and pivotally connected at its extremity to the extremity of the link, said link and crank having an aggregate length on centers equal to one-half the stroke of the pistons, whereby to stop the traveller and connected pistons at the limits of their reciprocation.

3. In a motion conversion unit for the purposes described a revolubly mounted power shaft, two hollow worm shafts independently revoluble on respective ends of the power shaft, respective unidirectional clutches cooperatively associated with each worm shaft and the power shaft to engage in the same direction whereby intermittent or oscillatory rotary movement of the worm shafts will transmit motion in one direction to the power shaft, a traveller reciprocable longitudinally of the power shaft, respective drivers revoluble thereon concentric with and engaged with the threads of respective worm shafts, and respective clutches on the traveller coactive between the drivers and traveller to engage and oppose rotation of the drivers opposite the direction of rotation of the power shaft and to free the drivers for rotation in the same direction with the power shaft.

4. In a crank assembly, a revoluble shaft having a fixed axis, a revoluble shaft movable transversely of its axis, means to reciprocate the second named shaft in a path extending on two sides of the first named shaft, a link element pivoted on one shaft and a crank on the other shaft, said link and crank being pivotally connected together having an aggregate length on centers equalling the distance from said fixed axis to the limit of reciprocation of the second named shaft.

5. In a motor of the character described, a motor frame, a multiplicity of opposed sets of cylinders all arranged symmetrically in parallel relation to a given axis, a power shaft revolubly mounted on said axis, worm shafts revoluble on different parts of the power shaft, a traveller reciprocable parallel to the power shaft, connected drivers on the worm shafts carried by the traveller revolubly in fixed spaced relation, unidirectional clutch means between the worm shafts and power shaft and between the drivers and traveller, said traveller comprising a frame having seats at respective ends, thrust and radial bearing elements in each end of the traveller frame, a nut element revolubly carried in each bearing and having reciprocable driving engagement with respective worm shafts, two parallel grooved guides beside the path of the traveller frame on each side, the traveller frame having complementary members interposed between the guides, and balls confined between the guides and complementary interposed members.

6. In a motor, two sets of cylinders longitudinally opposed, each set symmetrically arranged with respect to a common geometrical axis, a traveller reciprocable on said axis, respective pistons in the cylinders, all pistons being connected to the traveller whereby all reciprocate together and simultaneously in the same direction, a power shaft revolubly mounted on said axis, two hollow worm shafts independently revoluble on respective portions of the power shaft, respective unidirectional clutches cooperatively associated with each worm shaft and the power shaft, whereby intermittent rotation of the worm shafts will transmit motion in one direction to the power shaft, drivers revolubly mounted on the traveller concentric with and in driving engagement with respective worm shafts, and respective clutches on the traveller coactive between the traveller and drivers to oppose rotation of the drivers opposite the direction of rotation of the power shaft and to free the drivers for rotation in the same direction as the power shaft.

HENRY E. BLOMGREN.